(12) United States Patent  
Morisaki

(10) Patent No.: US 8,807,185 B2
(45) Date of Patent: *Aug. 19, 2014

(54) DEVICE FOR TURNING UP BODY PLY

(71) Applicants: Fuji Seiko Co., Ltd., Hashima (JP); Fuji Shoji Co., Ltd., Hashima (JP)

(72) Inventor: Toshiaki Morisaki, Hashima (JP)

(73) Assignees: Fuji Seiko Co., Ltd., Hashima-shi (JP); Fuji Shoji Co., Ltd., Hashima-shi (JP)

( * ) Notice: Subject to any disclaimer, the term of this patent is extended or adjusted under 35 U.S.C. 154(b) by 12 days.

This patent is subject to a terminal disclaimer.

(21) Appl. No.: 13/754,335

(22) Filed: Jan. 30, 2013

(65) Prior Publication Data

US 2013/0139971 A1    Jun. 6, 2013

Related U.S. Application Data

(63) Continuation of application No. 12/678,410, filed as application No. PCT/JP2008/065556 on Aug. 29, 2008, now Pat. No. 8,397,781.

(30) Foreign Application Priority Data

Oct. 25, 2007   (JP) .................................. 2007-278039

(51) Int. Cl.
    *B29D 30/32*   (2006.01)
(52) U.S. Cl.
    USPC .............................. 156/402; 156/400; 492/42
(58) Field of Classification Search
    USPC .......... 156/132, 400, 402, 421, 421.6; 492/42
    See application file for complete search history.

(56) References Cited

U.S. PATENT DOCUMENTS

| 2,409,974 | A |   | 10/1946 | Breth et al. |         |
|-----------|---|---|---------|--------------|---------|
| 2,614,952 | A | * | 10/1952 | Kraft        | 156/130 |
| 2,740,460 | A | * | 4/1956  | Miller et al.| 156/413 |
| 3,075,570 | A |   | 1/1963  | Richard      |         |

(Continued)

FOREIGN PATENT DOCUMENTS

| DE | 1919184 | * | 10/1969 | ............. B29H 17/22 |
| DE | 1729571 | * | 6/1971  | ............. B29H 17/22 |

(Continued)

OTHER PUBLICATIONS

Translation of DE 1919184 (original document dated Oct. 1969).*

(Continued)

*Primary Examiner* — Martin Rogers
(74) *Attorney, Agent, or Firm* — Oblon, Spivak, McClelland, Maier & Neustadt, L.L.P.

(57) ABSTRACT

A body ply turn-up device for turning up at least one width-end portion of a body ply expanded into a toroidal shape includes a plurality of arm components movable in the axial direction of an operating shaft and pivotable radially of the operating shaft. Guide members are respectively supported on an end portion of each arm component and coil springs are interposed in respective spaces between guide members. Elastic members respectively cover the outer surfaces of the coil springs for performing pressing at spaces between spiral wire portions thereof when the arm components are pivoted radially outward of the operating shaft. Alternatively, the guide portions include portions which are smaller than the inner diameter of the coil spring and which extend to positions nearly touching each other at a center in a lengthwise direction of each coil spring in a state that the arm components are contracted.

7 Claims, 18 Drawing Sheets

(56) References Cited

U.S. PATENT DOCUMENTS

| | | | |
|---|---|---|---|
| 3,948,591 A * | 4/1976 | Kratochvil et al. | ............ 425/32 |
| 4,362,592 A | 12/1982 | Ruppel | |
| 4,771,989 A | 9/1988 | Smith | |
| 6,666,940 B2 * | 12/2003 | Martin et al. | ................ 156/117 |
| 2002/0124968 A1 | 9/2002 | Gutknecht et al. | |
| 2006/0102272 A1 * | 5/2006 | Iyanagi et al. | ................ 156/132 |
| 2007/0068631 A1 | 3/2007 | Painter | |

FOREIGN PATENT DOCUMENTS

| | | | | |
|---|---|---|---|---|
| DE | 2344700 | * | 3/1975 | ............ B65G 39/02 |
| JP | 48 49865 | | 7/1973 | |
| JP | 50 20117 | | 7/1975 | |
| JP | 57 178740 | | 11/1982 | |
| JP | 2001 525748 | | 12/2001 | |
| JP | 2004 268371 | | 9/2004 | |
| JP | 2004-268371 | * | 9/2004 | ............ B29D 30/34 |
| SU | 891478 | * | 12/1981 | ............ B29H 17/12 |
| SU | 1126241 | * | 11/1984 | ............ A01F 11/02 |

OTHER PUBLICATIONS

English language Abstract for DE 1729571 (original document dated Jun. 1971).*

English language Abstract of SU 891478 (original document dated Dec. 1981).*

Machine-generated English language translation of DE 2344700 (original document dated Mar. 1975).*

English language translation of Japanese Application 2003-060979 (corresponding to publication JP 2004-268371, published in Sep. 2004).*

English language Abstract for SU 1126241 (original document dated Nov. 1984).*

Extended European Search Report issued Apr. 20, 2011, in Patent Application No. 08841628.4.

English language Abstract for DE 1919184.

English language Abstract for SU 891478.

* cited by examiner

DEVICE FOR TURNING UP BODY PLY

The present application is a continuation application of U.S. patent application Ser. No. 12/678,410, filed on Mar. 13, 2010, which is the National Stage of PCT/JP08/65556, filed Aug. 29, 2008 and claims priority to Japanese Patent Application 2007-278039, filed Oct. 25, 2007. The entire contents of U.S. patent application Ser. No. 12/678,410 are incorporated herein by reference.

TECHNOLOGICAL FIELD

The present invention relates to a body ply turn-up device for turning up both width-end portions of a body ply expanded into a toroidal shape to wrap bead cores therein and particularly, to a body ply turn-up device which is suitable for not only radial tires or the like being high in turn-up height for passenger cars but also those for trucks and buses.

BACKGROUND ART

As body ply turn-up devices which turn up both width-end portions of a body ply expanded into a toroidal shape on an operating shaft to wrap bead cores therein, there has been known one described in, for example, JP 2001-525748 A. The turn-up device described in the JP 2001-525748 A is provided with first pairs of pivotable arms (11, 12) and second pairs of pivotable arms (17, 19), and rollers (13, 14), (16, 18) are provided at end portions of the respective arms. The rollers (16, 18) on the second pairs of arms are offset behind the rollers (13, 14) on the first pairs of arms and are arranged in respective spaces between the rollers (13, 14).

In the construction described in the aforementioned JP 2001-525748 A, since two pairs of front and rear rollers different in phase are provided, the spaces between the mutual rollers on the first pairs of arms are supplementarily covered by the rollers on the second pairs of arms, so that an advantage is attained in that the both width-end portions of the body ply can be pressed by the two pairs of rollers over the whole circumference.

DISCLOSURE OF THE INVENTION

Measures for Solving the Problem

However, in the turn-up device described in the aforementioned JP 2001-525748 A, although the turn-up can be done relatively smoothly with those body plies having both width-end portions low in turn-up height, it becomes difficult with those body plies having both width-end portions high in turn-up height to perform the turn-up by an even pressing force over the whole circumference with air being released and without forming wrinkles.

Specifically, in the body plies having both width-end portions high in turn-up height, it is necessary to move the two pairs of rollers into an area which is large in tire diameter, and therefore, when the rollers reach the final stage of a turn-up operation, the extreme end portions of the arms become expanded to a considerably great extent. Accordingly, the rollers on the second pairs of arms, become unable to fully cover the space portions between the rollers on the first pairs of arms, and thus, there arises a problem that it is unable to turn up the both width-end portions of the body ply by an even pressing force over the whole circumference.

In addition, since fine lines at the parts turned up of the body ply go to expand in radial directions, it is desirable to turn up the body ply to follow the expansion directions. However, due to the inherency of construction, it is difficult for the rollers to perform the turn-up along the fine lines of the body ply over a wide angular area, and an apprehension arises in that wrinkles are formed at both width-end portions having been turned up of the body ply. That is, because a roller cannot rotate about any other axes but one rotational axis over its whole length, an axial center portion of the roller is able to perform a pressing with the roller rolling along a fine line, but axially opposite end portions of the roller become unable to turn up the both width-end portions of the body ply smoothly because, at the axially opposite end portions of the roller, the expanding directions of fine lines differ from the rolling direction of the roller. As a result, there arise problems that wrinkles are formed at the turned-up portions and that air cannot be exhausted from the body ply.

The present invention has been made in order to solve the aforementioned problems in the prior art and takes it as an object thereof to provide a turn-up device which is capable of turning up both width-end portions of a body ply by an even pressing force over the circumference without leaving any spaces even in the case of being high in turn-up height.

In order to solve the foregoing problems, the feature of the invention in a first aspect resides in that in a body ply turn-up device for expanding a body ply into a toroidal shape on an operating shaft and for turning up both width-end portions of the body ply to wrap therein bead cores provided at axially opposite sides of an expanded portion, a plurality of arm components are circumferentially arranged to be movable in the axial direction of the operating shaft and to be pivotable radially of the operating shaft, guide members are respectively supported at both sides of an end portion of each arm component to be rotatable about an axis parallel to a pivot axis of each arm component, coil springs are interposed in respective spaces each between two guide members respectively supported on the arm components adjoining, both end portions of the coil spring are respectively connected to the guide members, pressing members which supplementarily cover respective spaces between the coil springs are rotatably supported on the arm components ahead of or behind the coil springs, and at least the outer surfaces of the coil springs are covered with elastic members which are rich in elasticity.

The feature of the invention in a second aspect resides in that in a body ply turn-up device for expanding a body ply into a toroidal shape on an operating shaft and for turning up both width-end portions of the body ply to wrap therein bead cores provided at axially opposite sides of an expanded portion, a plurality of arm components are circumferentially arranged to be movable in the axial direction of the operating shaft and to be pivotable radially of the operating shaft, guide members are respectively supported at both sides of an end portion of each arm component to be rotatable about an axis parallel to a pivot axis of each arm component, coil springs are interposed in respective spaces each between two guide members respectively supported on the arm components adjoining, both end portions of the coil spring are respectively connected to the guide members, pressing members which supplementarily cover respective spaces between the coil springs are rotatably supported on the arm components ahead of or behind the coil springs, and the guide members are provided with pairs of guide portions of a predetermined length which expandably guide both end portions of the coil springs.

The feature of the invention in a third aspect resides in that in the first or second aspect, the pressing members comprise roller members and that the roller members are arranged to be offset behind the coil springs.

The feature of the invention in a fourth aspect resides in that in the first aspect, the elastic members comprise rubber tubes and that the rubber tubes cover the outer surfaces of the coil springs.

The feature of the invention in a fifth aspect resides in that in the first aspect, the elastic members cover the peripheries of the coil springs by insert shaping.

The feature of the invention in a sixth aspect resides in that in the second aspect, at least the outer surfaces of the coil springs are covered with elastic members which are rich in elasticity.

The feature of the invention in a seventh aspect resides in that in the second aspect, each pair of guide portions guiding both end portions of the coil spring extend to positions close to each other in the state that the arm components are contracted.

Effects of the Invention

In the invention in the first aspect, the coil springs are interposed in respective spaces between the guide members which are rotatably supported on both sides of the extreme ends of the plurality of arm components in the circumferential direction, and thus, even when the arm components are expansively opened as pressing portions on the coil springs are moved on the radially expanded portion of the body ply in the radially outward direction, the coil springs are expanded in correspondence to the expansive opening of the arm components, so that it becomes possible to press the both width-end portions of the body ply over a wide area in the circumference.

In addition, the coil springs are covered with the elastic members, and thus, even the expansion of the coil springs causes the spaces between spiral wire portions to be widened, the elastic members can serve to effectively perform Dressings at the spaces between the wire portions, and the rubber tubes can serve to increase the rigidity of the coil springs. Therefore, even when being expanded, the coil springs can press the body ply with themselves remaining in an arc shape, so that it is possible to press the body ply by an even pressing force along the fine lines thereof.

As a consequence, even in those body plies with the both width-end portions being high in turn-up height, it is possible to press the both width-end portions of the body ply with the coil springs and the pressing members by an even pressing force closely over the whole circumference without forming wrinkles at the turned-up portions and without air remaining, so that it becomes possible to precisely turn-up the both width-end portions of the body ply.

In the invention in the second aspect, since the coil springs are interposed in respective spaces between the guide members which are rotatably supported on both sides of the end portions of the plurality of arm components in the circumferential direction and since the guide portions of the predetermined length which guide both end portions of the coil springs to be expandable are protruded from the guide members, the rigidity of the coil springs can be increased thanks to the guide function of the guide portions. Therefore, even when being expanded, the coil springs can press the body ply with themselves remaining in an arc shape, so that it is possible to press the body ply by an even pressing force along the fine lines thereof.

As a consequence, even in those body plies with the both width-end portions being high in turn-up height, it is possible to press the both width-end portions of the body ply with the coil springs and the pressing members by an even pressing force closely over the whole circumference without forming wrinkles at the turned-up portions and without air remaining, so that it becomes possible to precisely turn up the both width-end portions of the body ply.

In the invention in the third aspect, since the pressing members comprise roller members and since the roller members are arranged to be offset behind the coil springs, the respective spaces between the coil springs are supplementarily covered by the roller members, so that it is possible to turn up the both width-end portions of the body ply as the coil springs and the roller members press the both width-end portions without leaving any spaces in the circumference.

In the invention in the fourth aspect, since the elastic members comprise rubber tubes and since the rubber tubes cover the outer surfaces of the coil springs, the rigidity of the coil springs can be increased, and by a simple operation that only includes using the rubber tubes to cover the outer surfaces of the coil springs, it becomes possible to perform the pressings at the respective spaces between the wire portions of the coil springs.

In the invention in the fifth aspect, since the elastic members cover the peripheries of the coil spring by insert shaping, it becomes possible to have covered the coil springs with the elastic members in insert shaping in advance, so that the coil springs can be enhanced in the quality that makes the assembling to the arm components easy.

In the invention in the sixth aspect, since at least the outer surfaces of the coil springs are covered with the elastic members which are rich in elasticity, the rigidity of the coil springs can be increased further, so that in addition to the effects of the second aspect, it is possible to perform the turn-up more reliably.

In the invention in the second aspect, since the pairs of guide portions guiding both end portions of the coil springs extend to positions close to each other in the state that the arm components are contracted, the guided length of the coil springs can be extended as long as possible, so that the rigidity of the coil springs can be increased further.

DESCRIPTION OF SYMBOLS

10 . . . turn-up device, 11 . . . operating shaft, 13 . . . movable body, 14 . . . bladder, 15 . . . body ply, 16 . . . bead core, 20 . . . lock member, 23, 123 . . . arm component, 24 . . . pivot pin, 25, 125 . . . arm, 34 . . . support member, 35, 135 . . . link member, 37 . . . support shaft, 38 . . . bearing, 39 . . . guide member, 39a . . . guide portion, 41 . . . coil spring, 42 . . . rubber tube, 43 . . . roller member, 50 . . . rubber elastic member.

PREFERRED EMBODIMENTS FOR PRACTICING THE INVENTION

Figure 15:
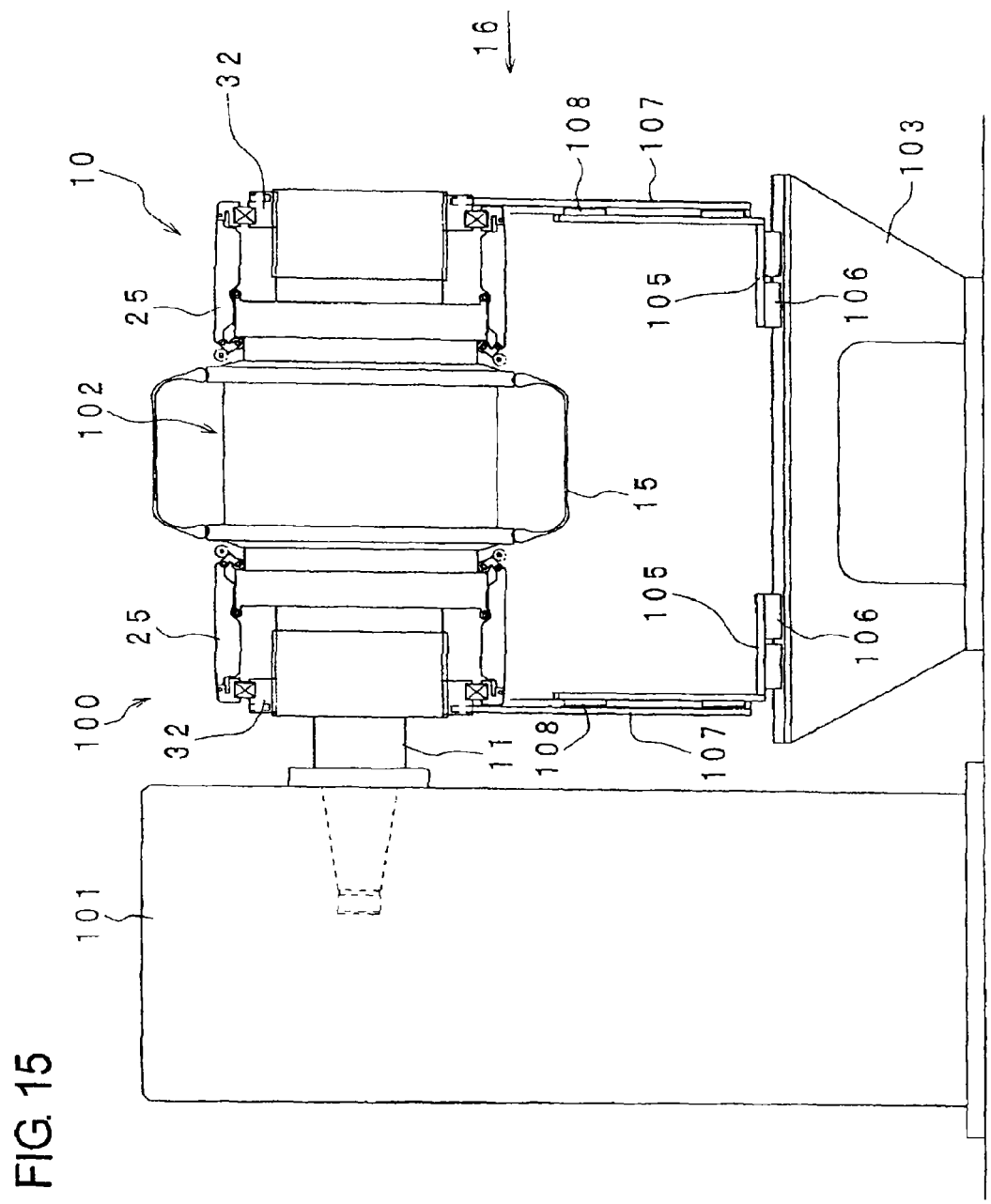
FIG. 15 is a front view showing the entirety of the tire shaping apparatus relating to the embodiments of the present invention.
Figure 16:
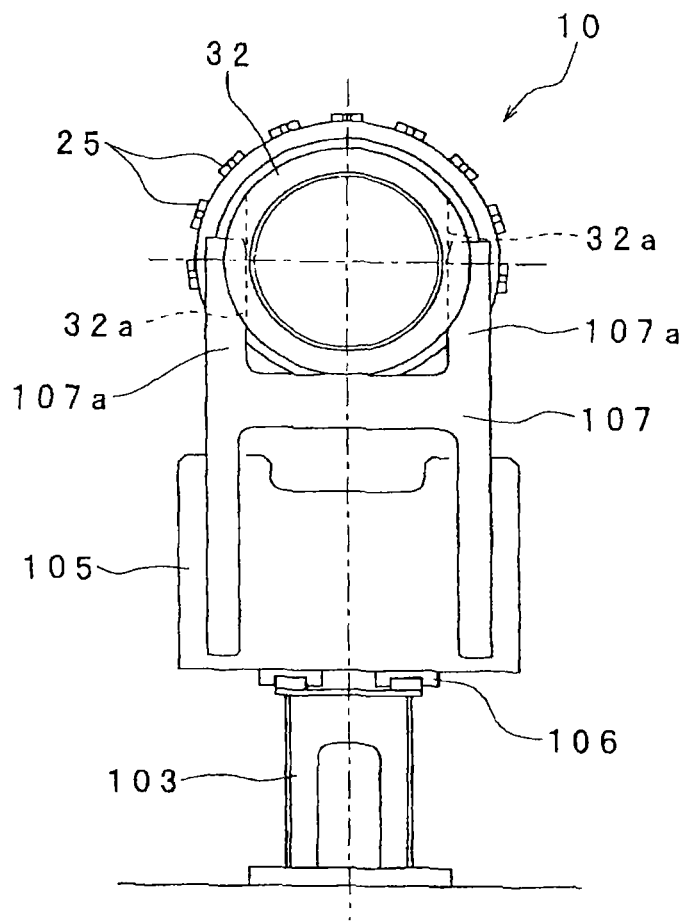
FIG. 16 is a side view of the tire shaping apparatus as viewed from the direction indicated at 16 in FIG. 15.

Hereafter, embodiments of the present invention will be described with reference to the drawings. FIGS. 15 and 16 show the entirety of a tire shaping apparatus 100 with a body ply turn-up device 10, and the tire shaping apparatus 100 is provided with a rotatable operating shaft 11. One end of the operating shaft 11 is detachably fitted in a spindle (not shown) which is rotatably supported in a drive box 101. The spindle is rotatable by a motor (not shown), and the operating shaft 11 is rotated through the spindle. The operating shaft 11 is provided thereon with a tire shaping drum 102, on which a tire is shaped, as mentioned later.

Further, the tire shaping apparatus 100 is provided with a support table 103 under the tire shaping drum 102, and on the support table 103, a pair of movable tables 105 are supported and guided by linear guides 106 to be slidable in a direction parallel to the axis of the operating shaft 11. On vertical walls of the respective movable tables 105, respective engaging members 107 are guided and supported by linear guides 108 to be movable in a vertical direction orthogonal to the axis of the operating shaft 11. The respective movable tables 105 and the respective engaging members 107 are movable by cylinder actuators (not shown) respectively in the direction parallel to the axis of the operating shaft 11 and in the vertical direction. The respective engaging members 107 are provided with bifurcated fork portions 107a which are disengageably engaged with nut members provided on the operating shaft 11 as described later.

Figure 1:
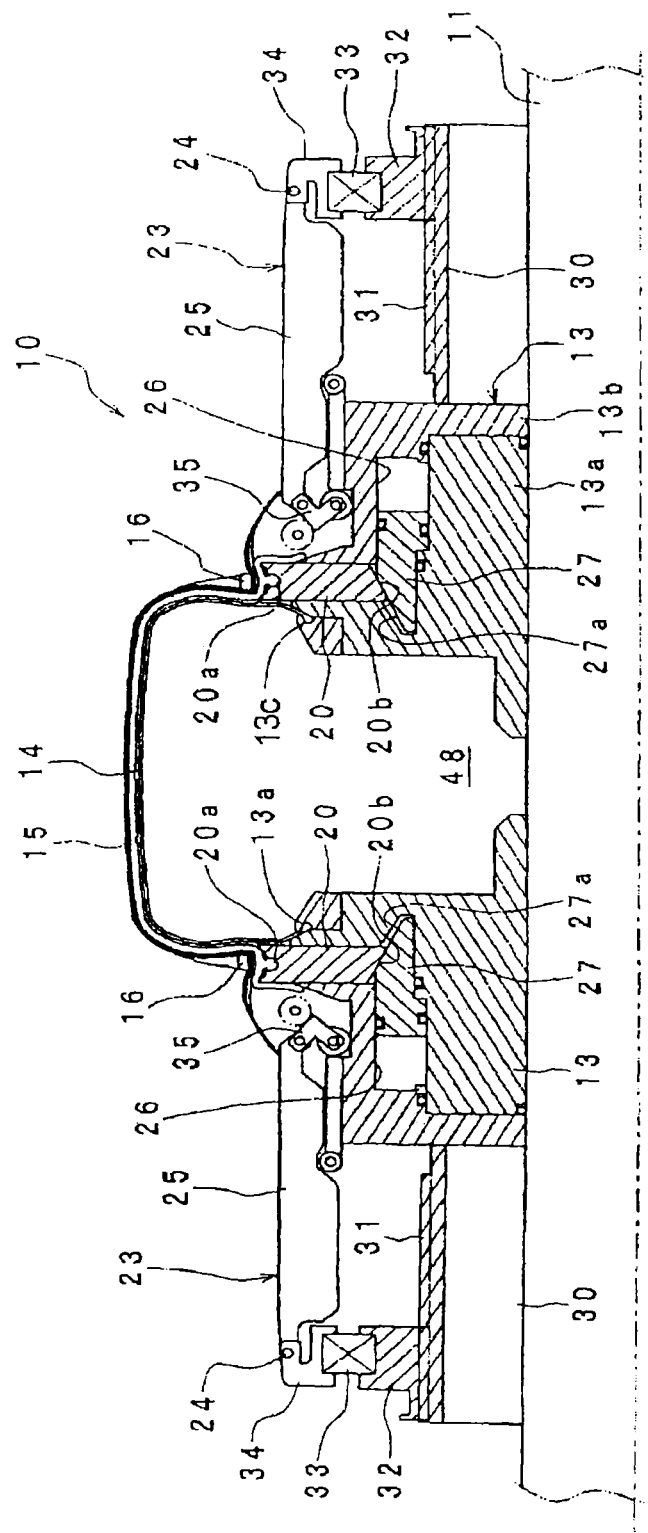
FIG. 1 is a sectional view of a body ply turn-up device in a tire shaping apparatus, showing a first embodiment of the present invention.
Figure 2:
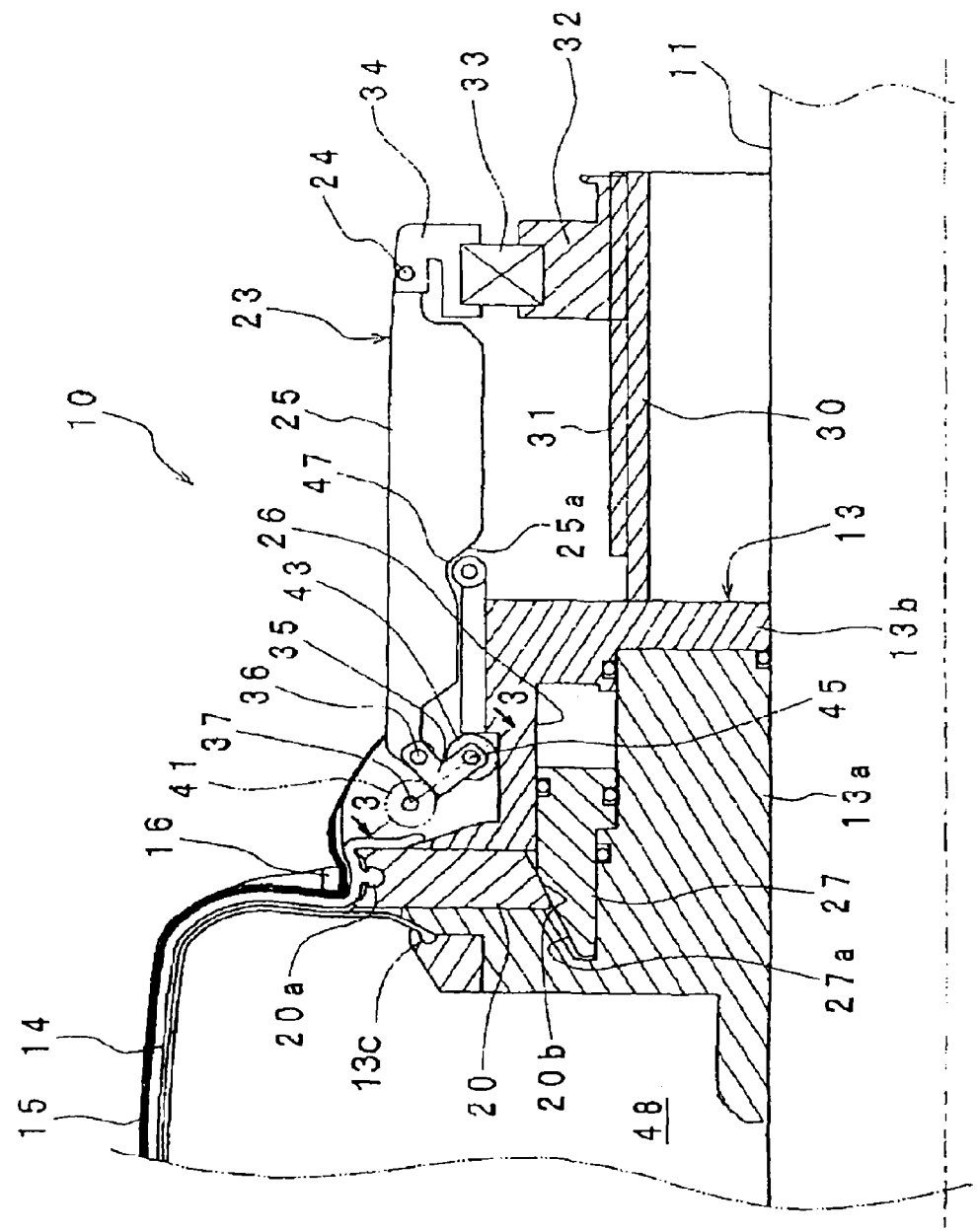
FIG. 2 is an enlarged view of an important part in FIG. 1.

As shown in FIGS. 1 and 2, on the operating shaft 11, a pair of left and right ring-like movable bodies 13 constituting the tire shaping drum 102 are supported to be movable in the axial direction of the operating shaft 11. The pair of movable bodies 13 are each composed of two members 13a, 13b connected to each other and are movable by drive means (not shown) through means such as a feed screw or the like in a direction in which they come close, or separate, from each other.

A cylindrical bladder 14 is attached between the pair of movable bodies 13, and opposite end edge portions of the bladder 14 are engaged with bladder engaging portions 13c formed at respective facing end portions of the pair of movable bodies 13. The outer surface of the bladder 14 fits thereon a body ply 15 which has been shaped to a cylindrical shape at a preceding step, and bead cores 16 are fitted on the outer surfaces of axially opposite end portions of the body ply 15. The bladder 14 is composed of an inner elastic member, an outer elastic member and a core member interposed between both of the elastic members. Ring-like attaching protruding portions which are engaged with the bladder engaging portions 13c are formed at the opposite end edges of the inner elastic member of the bladder 14, and ring-like coupling protruding portions which are engaged with lock members 20 described later are formed at opposite end edges of the outer elastic member.

At the outer circumferential surface of the pair of movable bodies 13, a plurality of lock member 20 in the circumference are received to be movable in radial directions. Outer ends of these lock members 20 have coupling hollow portions 20a which fit therein the coupling protruding portions formed at opposite end portions of the bladder 14, whereas inner end portions of the respective lock members 20 have inclined inner surfaces 20b. The bead cores 16 are fitted on the outer surface of the body ply 15 at respective positions corresponding to the coupling hollow portions 20a of the lock members 20.

Further, the pair of movable bodies 13 have formed therein ring-like cylinder actuators 26 concentric to the axis of the operating shaft 11. In the cylinder actuators 26, ring-like pistons 27 with inclined outer surfaces 27a which are engageable with the inclined inner surfaces 20b of the lock members 20 are fitted to be slidable in the axial direction of the operating shaft 11. Thus, when the pistons 27 are moved toward the lock members 20 sides with compressed air supplied to the cylinder actuators 26, the engagements of the inclined outer surfaces 27a and the inclined inner surfaces 20b cause the respective lock members 20 to be moved radially outward against the resilient force of the bladder 14. With the radially outward movements of the lock members 20, the both width-end portions of the body ply 15 are put to be pressed between the bladder 14 and the bead cores 16. When the pistons 27 moved in directions away from the lock members 20, the respective lock members 20 are moved radially inward in connection therewith.

In correspondence to the respective lock members 20 fitted in the pair of movable bodies 13, there is arranged a turn-up device 10 for turning up the both width-end portions of the body ply 15. The turn-up device 10 is provided with a plurality of arm components 23 arranged in the circumference which support first and second pressuring members for pressing and turning up the both width-end portions of the body ply 15. Respective arm components 23 have pivotable arms 25, whose base end portions are supported by pivot pins 24 which are arranged on a circle concentric to the axis of the operating shaft 11, to be pivotable within planes including the radial directions of the operating shaft 11.

Figure 17:
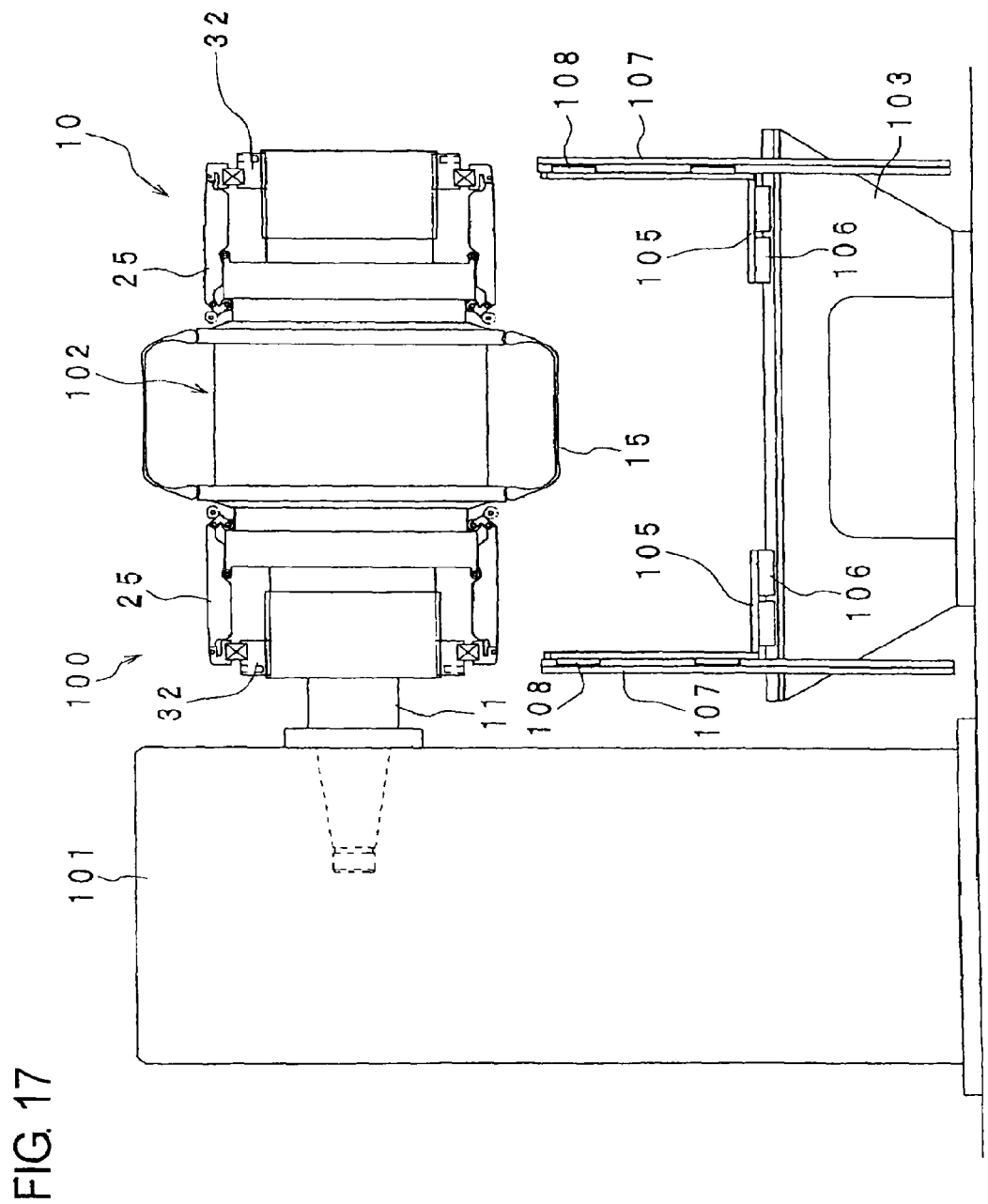
FIG. 17 is a front view of the tire shaping apparatus showing an operational state in FIG. 15.
Figure 18:
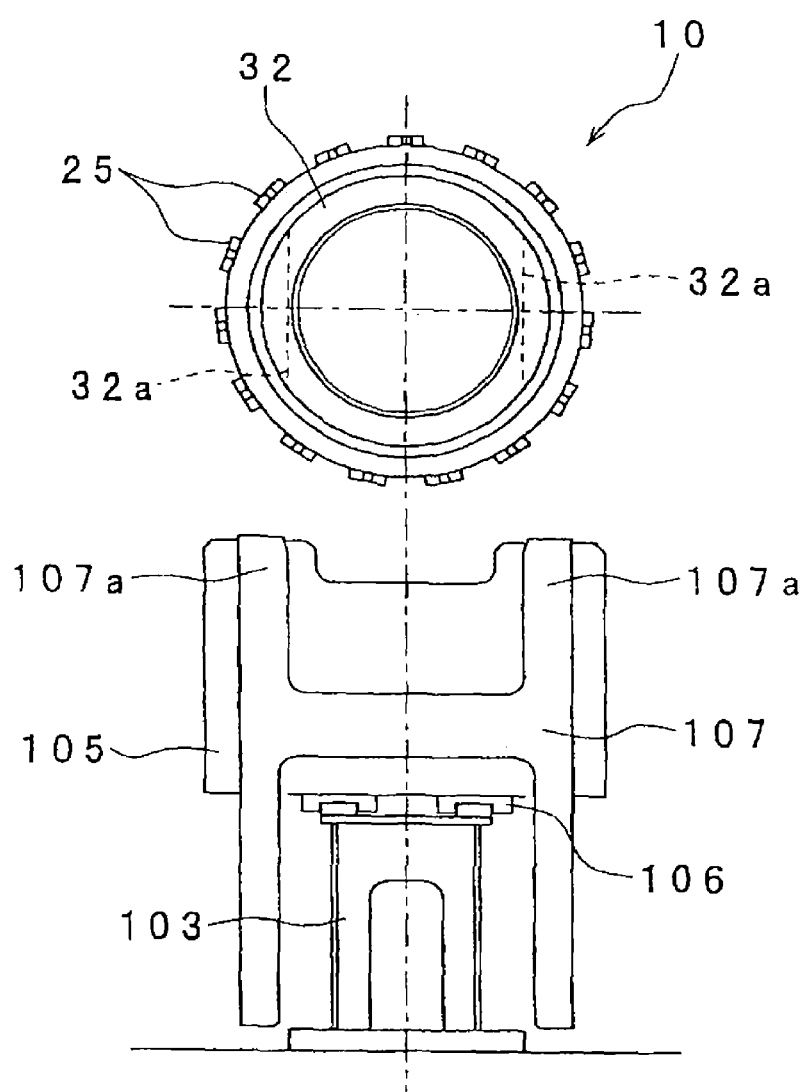
FIG. 18 is a side view of the tire shaping apparatus showing the operational state in FIG. 16.

A pair of left and right screw sleeves 30 having screw portions 31 on outer surfaces thereof are joined with the opposite sides of the pair of movable bodies 13 in a concentric relation with the operating shaft 11. Nut members 32 are screw-engaged with the screw portions 31 of the pair of screw sleeves 30, respectively. As shown in FIG. 16, each nut member 32 has engaging portions 32a which are cut out in parallel relation at two places on the circumference, and the fork portion 107a of each of the aforementioned engaging members 107 is disengageably engaged with these engaging portions 32a, and the rotation of the nut members 32 are restricted by the engagements of the fork portions 107a with the nut members 32. That is, when the engaging members 107 are moved up by cylinder actuators (not shown) to a lifted end position, the fork portions 107a are bought into engagements with the engaging portions 32a of the nut members 32, so that the nut members 32 are restricted from rotation.

Where the body ply 15 is to be fitted on the outer circumferential surface of the bladder 14, the engaging members 107 are lowered by the cylinder actuators (not shown) to a lower end position, as shown in FIGS. 17 and 18, whereby the fork portions 107a are disengaged from the engaging portions 32a of the nut members 32 to release the nut members 32 from the restriction against rotation. Thus, it becomes possible to load the ring-like body ply 15 from one end side of the tire shaping drum 102, so that the body ply 15 can be fitted on the outer circumferential surface of the bladder 14.

Ring-like support members 34 are supported on the outer circumferences of the nut members 32 through bearings 33 to be possible only in rotation. The arms 25 are supported at their base end portions on the support members 34 through the aforementioned pivot pins 24.

Figure 3:
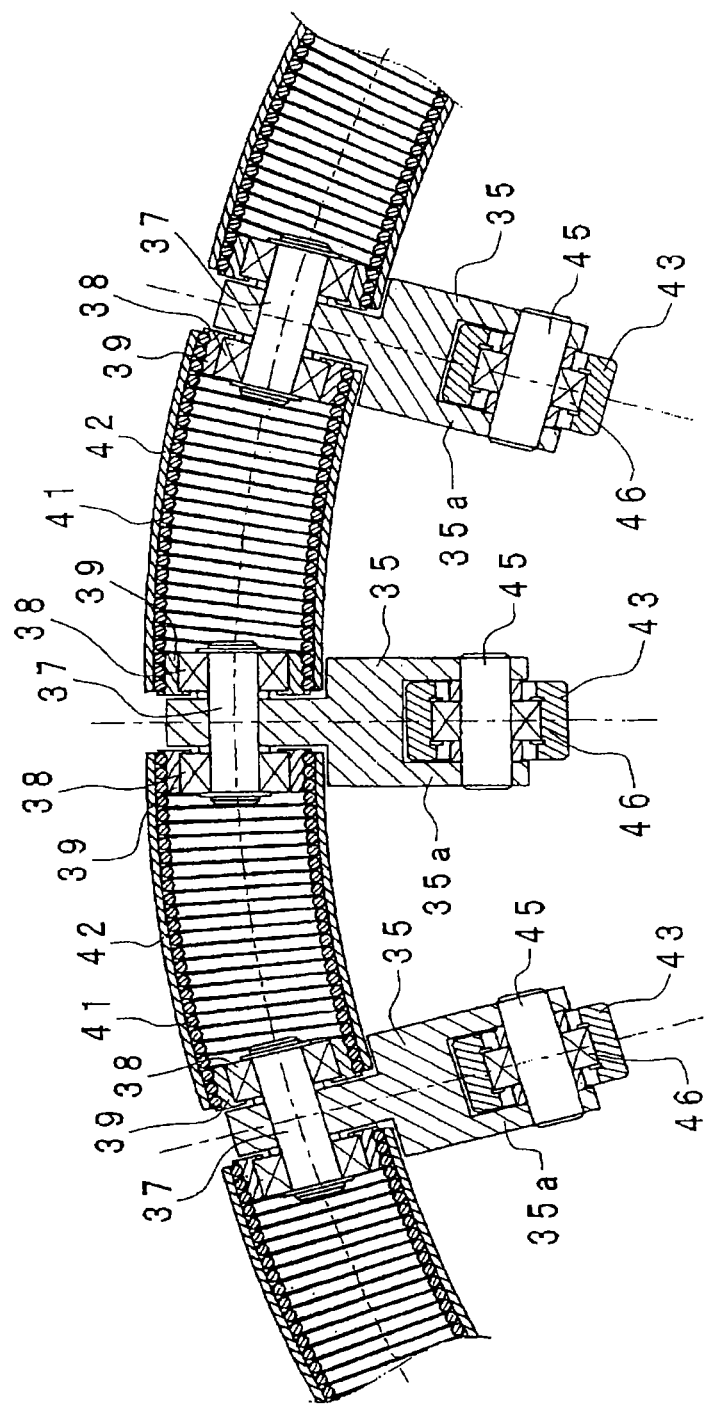
FIG. 3 is a sectional view taken along the line 3-3 in FIG. 2.

At an extreme end portion of each arm 25, a link member 35 is supported pivotably about a support pin 36 parallel to the pivot pin 24. As shown in FIG. 3, a support shaft 37 passes through one end of the link member 35 in a direction parallel to a pivot axis (the axis of the support pin 36) of the link member 35, and opposite end portions of the support shaft 37 protrude from the opposite end surfaces of the link member 35. The opposite end portions of the support shaft 37 rotatably support guide members 39 through bearings 38, respectively. The aforementioned arm 25 and the link member 35 constitute the arm component 23.

Between the guide members 39 which are supported on the support shafts 37 of the adjoining link members 35 to face with each other, there is interposed coil spring 41 as first pressing member which presses and turns up the both width-end portions of the body ply 15. Each coil spring 41 comprises a tension spring, one end of which is fitted on the outer surface of the guide member 39 supported by one of the link members 35, and the other end of which is fitted on the outer surface of the guide member 39 supported by the other link member 35 to be bodily joined therewith.

By the resilient force of the coil spring 41, the adjoining link members 35 are urged to each other in a direction to contract the space therebetween in the circumferential direction, that is, in a direction to close the plurality of arm components 23 in radial directions, and by this resilient force, the plurality of arm components 23 are usually held at home positions to remain in the horizontal state shown in FIGS. 1 and 2. Then, when the arms 25 are pivotally moved against the resilient force of the coil springs 41, the space between the adjoining link members 35 in the circumferential direction is expanded.

Figure 4:
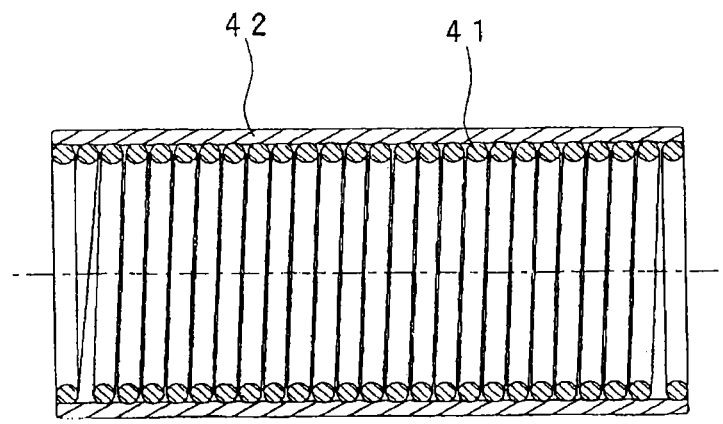
FIG. 4 is a sectional view of a coil spring with the outer surface covered with a rubber tube.

As illustrated in detail in FIG. 4, each coil spring 41 is covered at its outer surface with a rubber tube 42 as a resilient member which is rich in elasticity.

Figure 6:
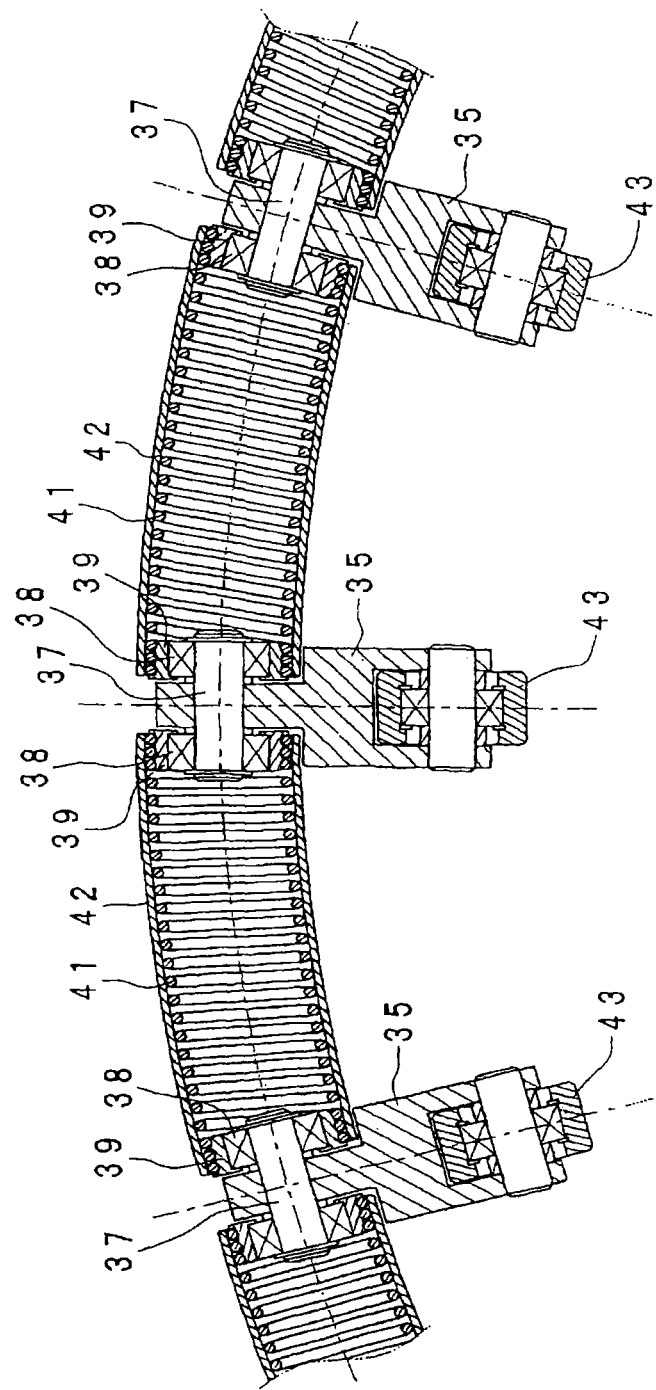
FIG. 6 is a sectional view taken along the line 6-6 in FIG. 5.

Thus, the coil springs 41 are expanded and contracted together with the rubber tubes 42 when the pivotal movements of the arms 25 cause the spaces between the link members 35 of the adjoining arm components 23 to expand or contract. At this time, as shown in FIG. 6, although the expansion of the coil spring 41 causes the spaces between spiral wire portions to increase, the spaces are covered by the rubber tube 42, so that the entire length of the coil spring 41 can substantially act to press the both width-end portions of the body ply 15.

In addition, the rubber tube 42 serves to increase the rigidity of the coil spring 41 against bending, and thus, even when a reaction force in the turn-up operation acts at the time of the coil springs 41 expanding, the coil springs 41 are enabled to press the body ply 15 with themselves remaining in an arc shape taking the center on the operating shaft 11. Accordingly, the coil spring 41 is enabled to rotate about an arc axis and to rotate along the radial direction of the operating shaft 11 over the entire length thereof. That is, because with the pivot movements of the arms 25, the coil springs 41 not only are expanded and contracted, but also change the arc curvature of their rotational axes in correspondence to the position of the coil springs 41 in the radial direction of the operating shaft 11, it becomes possible to press the body ply 15 by an even pressing force along fine lines of the body ply 15 and to reliably release air from the turned-up portion in the body ply 15.

The coil springs 41 may be a square shape or round shape in cross-section.

As shown in FIG. 3, the other ends of the link members 35 are formed with bifurcated portions 35a in correspondence to respective spaces between the adjoining coil springs 41, and roller members 43 as second pressing members which press and turn up the both width-end portions of the body ply 15 are rotatably supported on support shafts 45 parallel to the pivot spins 24 through bearings 46. The roller members 43 are arranged at positions slightly offset behind the coil springs 41, that is, to be closer to the pivot pins 24 in the lengthwise directions of the arms 25 and each have a wider roller width than the space between the adjoining coil springs 41.

With the aforementioned construction, a circumferential area of each space between the arm components 23 is covered by the coil spring 41 being able to expand and contract, while an angular area of each space between these coil springs 41 is supplementarily covered by the roller member 43, so that the plurality of coil springs 41 and roller members 43 in the circumference are enabled to press the both width-end portions of the body ply 15 over the entire circumference without leaving any spaces.

As a result, through rotations of the coil springs 41 arranged at respective spaces between the adjoining arm components 23, it is possible to press the both width-end portions of the body ply 15 over the wide area in the circumferential direction, and since the rubber tubes 42 cover the outer surfaces of the coil springs 41, the rubber tubes 42 are able to perform pressings at the space portions between the wire portions even when the expansions of the coil springs 41 cause the spaces between the spiral wire portions to be widened. Therefore, it becomes possible to reliably turn up the both width-end portions of the body ply 15 as air is released from the turned-up portions of the body ply 15.

Usually, as shown in FIGS. 1 and 2, the arms 25 are held in an approximately horizontal state that the roller members 43 contact outer surfaces of the movable bodies 13, in which state, the plurality of link members 35 supported at the respective extreme end portions of the arms 25 are held in a state that they are closest to one another in the circumferential direction. In this state, the coil springs 41 arranged at respective spaces between the adjoining links 35 remain in the state that they are most contracted in the circumferential direction, as shown in FIG. 3. When the arms 25 are pivoted about the pivot pins 24 to bring the extreme end portions in the radially outward directions, the spaces in the circumferential direction of the adjoining link members 35 are widened with the pivot movements, whereby the coil springs 41 are expanded together with the rubber tubes 42, as shown in FIG. 6.

As shown in FIG. 2, each arm 25 has formed thereon an oblique cam surface 25a with which an engaging roller 47 attached to the movable body 13 is engaged, and when the advancements of the nut members 32 cause the arms 25 to move toward the both width-end portions of the body ply 15, the oblique cam surfaces 25 are engaged with the engaging rollers 47 to pivotally move the arms 25. Thus, each coil spring 41 is brought into contact with a turn-up start portion on the body ply 15.

Next, the operation of the turn-up device as constructed above will be described. Usually, the pair of movable bodies 13 remain at positions separated from each other, and the nut members 32 are held at retracted end positions (home positions) on the screw sleeves 30. In this state, the body ply 15 is fitted on the outer circumference of the bladder 14, and the bead cores 16 are set at the both width-end portions of the body ply 15. At this time, the engaging members 107 are held at the lower end position where the fork portions 107a are disengaged from the engaging portions 32a of the nut members 32, as shown in FIGS. 17 and 18, so that it becomes possible to fit the ring-shape body ply 15 on the outer circumference of the bladder 14. Further, the pistons 27 in the cylinder actuators 26 are at retracted positions with the lock members 20 retracted radially inward.

In this state, compressed air is supplied from an air supply passage (not shown) to an inner space 48 of the bladder 14, and both of the movable bodies 13 are moved to come close to each other to narrow the space between the both width-end portions of the bladder 15. As a consequence, as shown in FIGS. 1 and 2, the bladder 14 is expanded toward a radial outward side with a result that a central part of the body ply 15 is radially expanded into a toroidal shape.

In this case, as shown in FIGS. 1 and 2, compressed air is also supplied into the cylinder actuators 26, and the pistons 27 are moved to come close to the lock members 20 sides, whereby the respective lock members 20 are moved to be protruded in the radially outward directions through the engagements of the inclined outer surfaces 27a and the inclined inner surfaces 20b. With the protruding movements, the bead cores 16 on the body ply 15 are pressed from the radially inner sides toward the radially outward sides and are locked.

Thereafter, the engaging members 107 are lifted up by the cylinder actuators (not shown), and as shown in FIGS. 15 and 16, the fork portions 107a of the engaging members 107 are engaged with the engaging portions 32a of the nut members 32. Thus, the nut members 32 are restricted not to be rotated.

Then, the operating shaft 11 is rotated by the motor (not shown) through the spindle, and the pair of left and right screw sleeves 30 are rotated with the rotation of the operating shaft 11. With the rotations of the screw sleeves 30, the nut members 32 being restricted from rotation are moved by the screw action in the directions in which they come close to each other, and the support members 34 supporting the base end portions of the arms 25 are advanced through the bearings 33 toward an diametrically expanded portion of the body ply 15. In this case, while the nut members 32 are moved, the engaging members 107 engaged therewith and the movable tables 105 are moved in the direction parallel to the axis of the operating shaft 11 as they are guided by the linear guides 106. When the arms 25 are advanced together with the support members 34, the arms 25 begin to be pivotally moved through the engagements of the oblique cam surfaces 25a with the engaging rollers 47, whereby the coil springs 41 rotatably supported between the adjoining arm components 23 and the roller members 43 rotatably supported on the arm components 23 begin to turn up the both width-end portions of the body ply.

Specifically, with the movements of the nut members 32, the arm components 23 are pivotally moved about the pivot pins 24 against the resilient forces of the coil springs 41, and the coil springs 41 going ahead are brought into contact with the both width-end portions of the body ply 15. Then, the coil springs 41 turn up the both width-end portions of the body ply 15 to wrap the bead cores 16 therein while pressing the both width-end portions of the body ply 15 by the resilient forces of the coil springs 41 themselves. With the advances of the nut members 32, the arm components 23 are pivotally moved about the pivot pins 24 to move the coil springs 41 radially outward directions along the shapes of the side surfaces of the body ply 15 which has been radially expanded into the toroidal shape.

Figure 5:
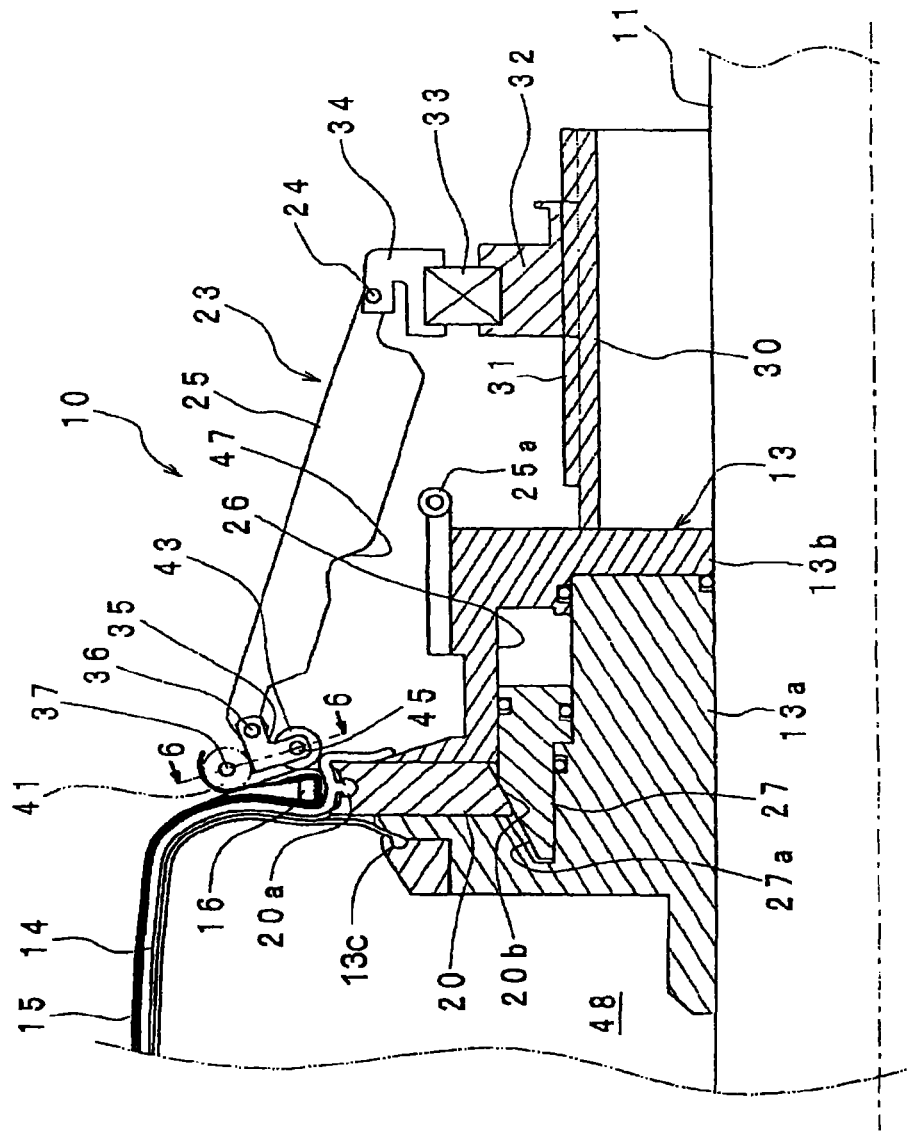
FIG. 5 is a view showing an operational state in FIG. 2.

Thereafter, as shown in FIG. 5, the roller members 43 supported by the arm components 23 are brought into contact with the both width-end portions of the body ply 15 and press the both width-end portions of the body ply 15 to cover the gaps in the circumferential direction between those places which are at the both width-end portions of the body ply 15 and which are being pressed by the coil springs 41, and turn up the both width-end portions to wrap the bead cores 16 therein. At this time, the link members 35 are floating to pivot about the support pins 36 to make the coil springs 41 and the roller members 43 even in pressing force.

When the arm components 23 are pivotally moved about the pivot pins 24 with the advances of the nut members 32, the mutual spaces between the extreme ends (link members 35) of the arm components 23 are expanded as shown in FIG. 6, and the coil springs 41 are expanded in correspondence thereto. Accordingly, even when the spaces between the extreme end portions of the arm components 23 are expanded, the coil springs 41 which are expanded in correspondence thereto can press the both width-end portions of the body ply 15 over a wide angular area.

At this time, because the coil springs 41 have been increased in rigidity by being covered with the rubber tubes 42, the coil springs 41, even when expanded, can press the body ply 15 while maintaining the arc shape taking the operating shaft 11 as its center. Accordingly, the coil springs 41 are rotated about the arc axes, and each coil spring 41 is rolled to follow the radial direction of the operating shaft 11 over its entire length.

Accordingly, it becomes possible to reliably press the body ply 15 along the fine lines thereof (in the radial directions) by an even pressing force. As a result, it is possible to reliably release air from the turned-up portions of the body ply 15 without forming wrinkles at the turned-up portions, so that the both width-end portions of the body ply 15 can be turned up precisely.

Figure 7:
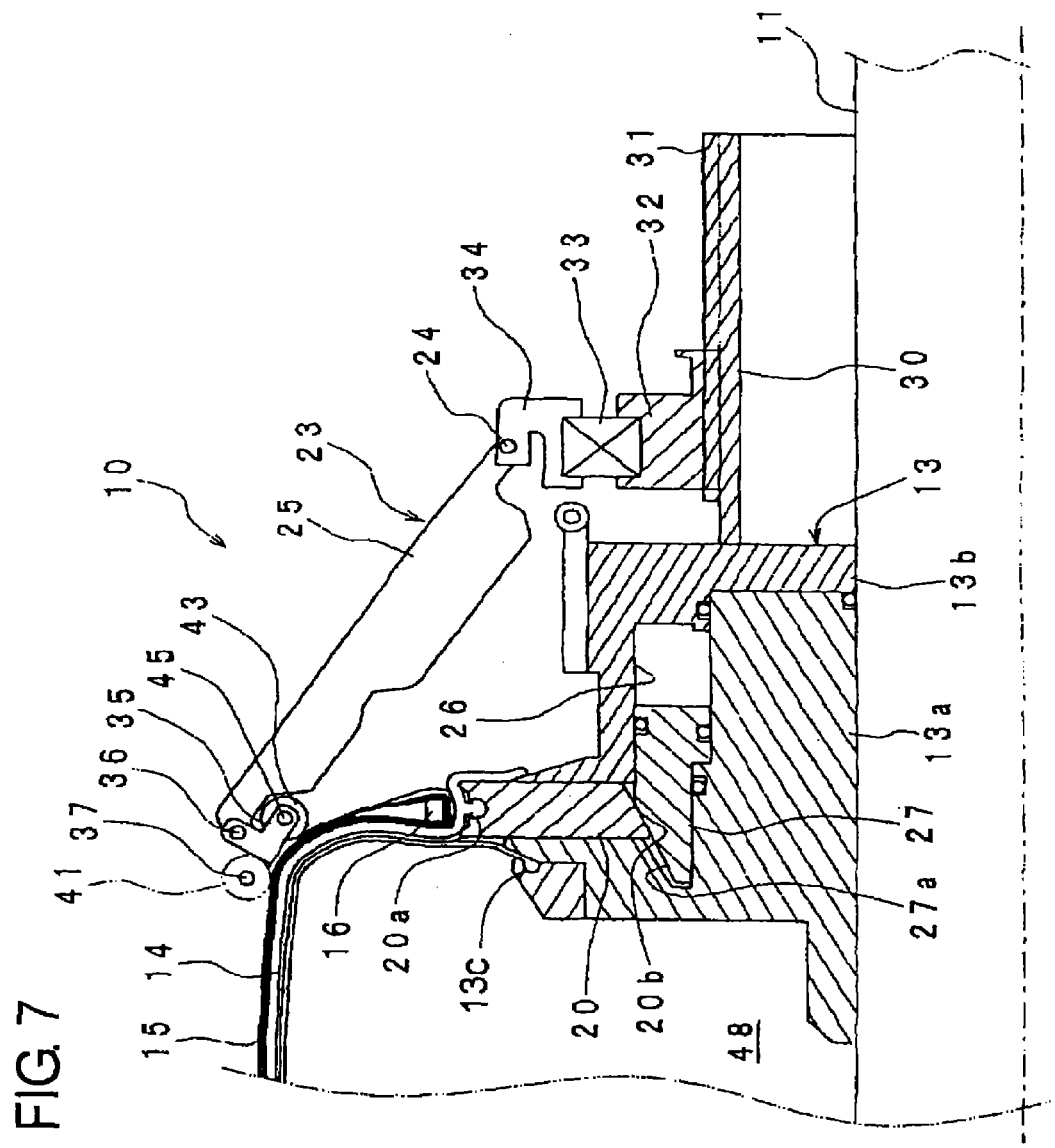
FIG. 7 is a view showing an operational state upon completion of a turn-up in FIG. 2.

When the arm components 23 are pivotally moved through a predetermined angle with the advances of the nut members 32 to predetermined positions, as shown in FIG. 7, the roller members 43 are moved to a radially outward position where they press terminal edge portions of the both width-end portions of the body ply 15, whereby the turn-up of the both width-end portions of the body ply 15 is completed.

At the time of the foregoing turn-up of the both width-end portions of the body ply 15, it is possible to precisely turn up the both width-end portions of the body ply 15 by changing the rotational speed of the operating shaft 11 rotated by the motor in such a manner that the moving speed of the roller members 43 contacting the both width-end portions of the body ply 15 is made to be slow at the early stage of the turn-up of the both width-end portions of the body ply 15 and to be fast at the final stage of the turn-up.

When the turn-up of the both width-end portions of the body ply 15 is completed, the operating shaft 11 is rotated in a direction opposite to the foregoing, and the pair of left and right screw sleeves 30 are reversely rotated. The reverse rotations of the screw sleeves 30 cause the nut members 32 to be moved by the screw action in the directions to separate from each other. When the nut members 32 are retracted to the retracted end positions, the arm components 23 are returned to the home positions shown in FIGS. 1 and 2.

After the turn-up of the both width-end portions of the body ply 15 is completed, belt and tread annular members which have been manufactured at different steps are fitted on the outer circumferential surface of the body ply 15 having been radially expanded into the toroidal shape, and then, belt-like rubber members are put on side surfaces of the body ply 15 to form side walls, in which case it is necessary to rotate the tire shaping drum 102. Accordingly, even in this case, the fork portions 107a of the engaging members 107 are released from the engagements with the engaging portions 32a, so that the nut members 32 are allowed to rotate bodily with the movable bodies 13.

When a green tire is completed by forming the side walls and the like on the side surfaces of the body ply 15 having been radially expanded into the toroidal shape, the compressed air having been supplied in the inner space 48 of the bladder 14 is exhausted, and both of the movable bodies 13 are moved in the directions to be separated from each other and are returned to the home positions. Subsequently, the green tire is detached from on the tire shaping drum 102, and the green tire is transferred to a vulcanization step for vulcanization and shaping in a mold.

According to the foregoing first embodiment, the outer surfaces of the coil springs 41 are covered with the rubber tubes 42, and therefore, even when the expansion of the coil spring 41 makes the spiral wire portions of the coil spring 41 widen the spaces therebetween, it becomes possible to effectively perform pressings at the space portions between the wire portions.

In addition, since the rubber tubes 42 serve to increase the rigidity of the coil springs 41, and even at the time of the coil springs 41 being expanded, it is possible to press the body ply 15 with the coil springs remaining in an arc shape. Therefore, the arc curvature of the rotational axis of each coil spring 41 is changed in correspondence to the axial position of the arm component 23, that is, the position of each coil spring 41 in the radial direction of the operating shaft 11, so that it is possible to press the body ply 15 by an even pressing force along the fine lines thereof.

As a consequence, even in those body plies 15 with the both width-end portions being high in turn-up height, it is possible to press the both width-end portions of the body ply 15 with the coil springs 41 and the pressing members 43 by an even pressing force closely over the whole circumference without forming wrinkles at the turned-up portions and without air remaining, so that it becomes possible to precisely turn up the both width-end portions of the body play 15. Therefore, it is possible to give a concrete form of the body ply turn-up device 10 which is suitable for radial tires or the like with a high turn-up height for passenger cars, trucks and buses.

Figure 8:
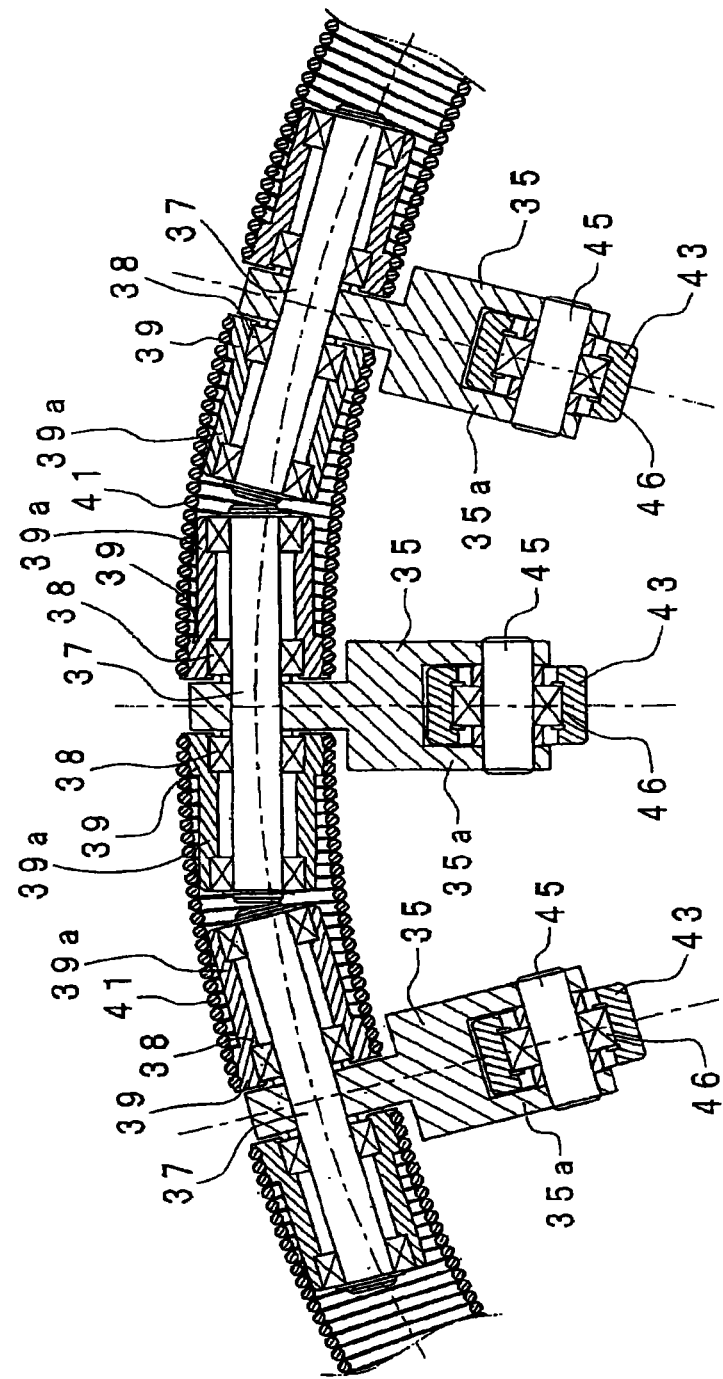
FIG. 8 is a view showing a second embodiment of the present invention.
Figure 9:
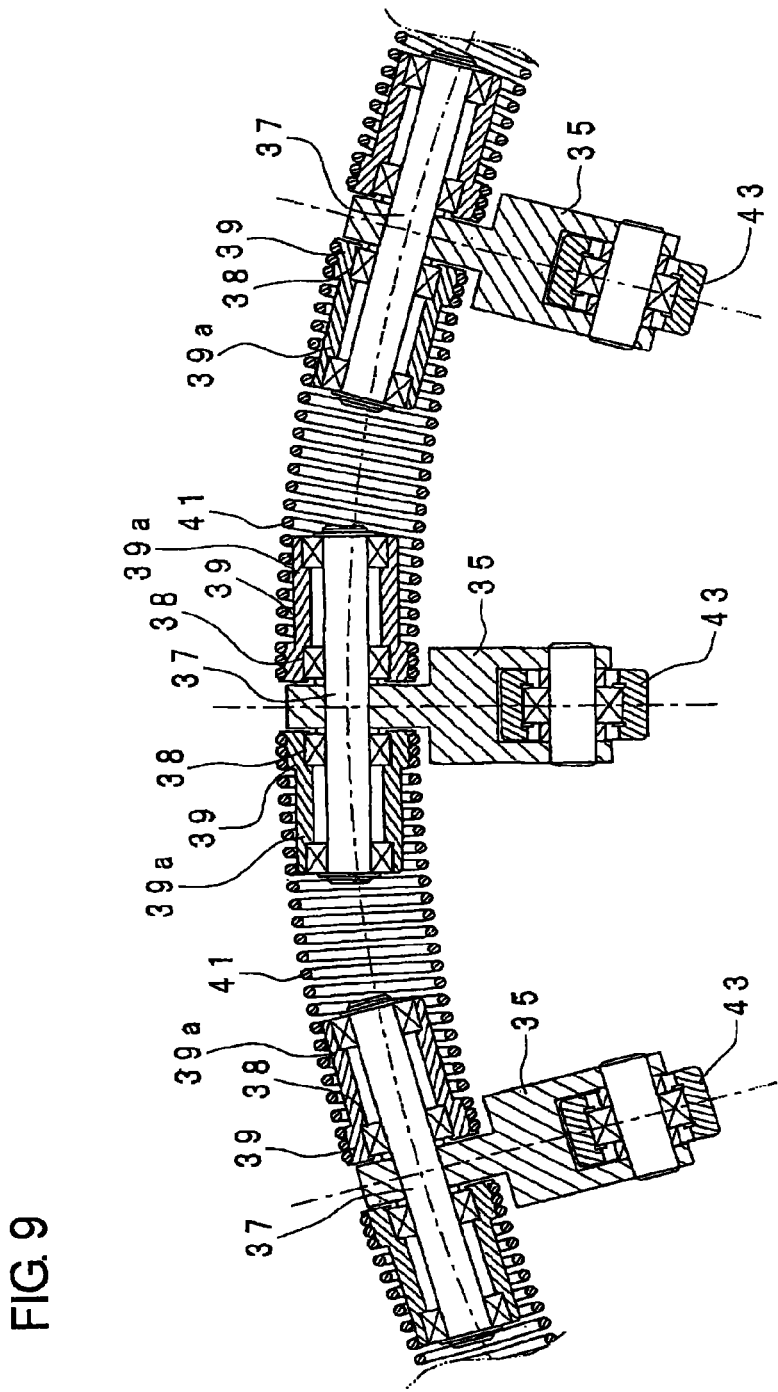
FIG. 9 is a view showing an operational state in FIG. 8.

FIGS. 8 and 9 show a second embodiment of the present invention, wherein the difference from the first embodiment resides in increasing the rigidity of the coil springs 41 by guiding both end portions of the coil springs 41 by guiding portions instead of covering the outer surfaces of the coil springs 41 with the rubber tubes 42. Hereafter, those different from the first embodiment will mainly be described, and regarding the same component parts as those in the first embodiment, description will be omitted by giving the same reference numerals to the same components.

In FIG. 8, guide members 39 connected to opposite end portions of the coil spring 41 protrude from base end portions thereof guide portions 39a which enable the opposite end portions of the coil spring 41 to expand or contract, through a predetermined length. The outer diameter of the guide portions 39a is set to be slightly smaller than the inner diameter of the coil springs 41. Two guide portions 39a protruded from the respective guide members 39 of the adjoining arm components 23 mutually face to be close to each other as shown in FIG. 8 in the state that the arm components 23 are held horizontally with the spaces between the adjoining link members 35 being most narrowed. The guide portions 39 guide the opposite end portions of the coil spring 41 over the axial lengths of the guide portions 39a when, in particular, the coil spring 41 is expanded, to increase the rigidity of the coil spring 41, so that each coil spring 41 is prevented from going back due to a reaction force in the turn-up operation.

As described above, the opposite end portions of each coil spring 41 are guided by the guide portions 39a of the guide members 39, and thus, even when the extreme end portions of the arm components 23 are radially expanded to expand the coil springs 41 as shown in FIG. 9, the coil springs 41 can press the both width-end portions of the body ply 15 as they remain in the state of an approximately arc shape, so that it is possible to press the body ply 15 along the fine lines thereof and to reliably release air from the body ply 15.

When the coil springs 41 are expanded, the spaces between the spiral wire portions become widened as shown in FIG. 9, and thus, if the rubber tubes 42 as described in the first embodiment were not provided, the portions at which the coil springs 41 press the body ply 15 would become a group of spaced points. However, with the rotations of the coil springs 41, the portions pressed by the spiral wire portions are shifted in the axial direction, so that it becomes possible for the coil springs 41 to press the both width-end portions of the body ply 15 over their entire lengths without leaving any spaces.

As described above, according to the foregoing second embodiment, the rigidity of the coil springs 41 at the time of turn-up can be increased by guiding the opposite end portions of each coil spring 41, and therefore, it become possible to achieve the same effects as described in the first embodiment wherein the rubber tubes 42 cover the outer surfaces of the coil springs 41, that is, it becomes possible even in the body ply 15 with the both width-end portions being high in turn-up height to press the both width-end portions of the body ply 15 by an even pressing force closely over the circumferential direction without forming wrinkles on the turned-up portions and without air remaining, so that the both width-end portions of the body ply 15 can be turned up precisely.

Figure 10:
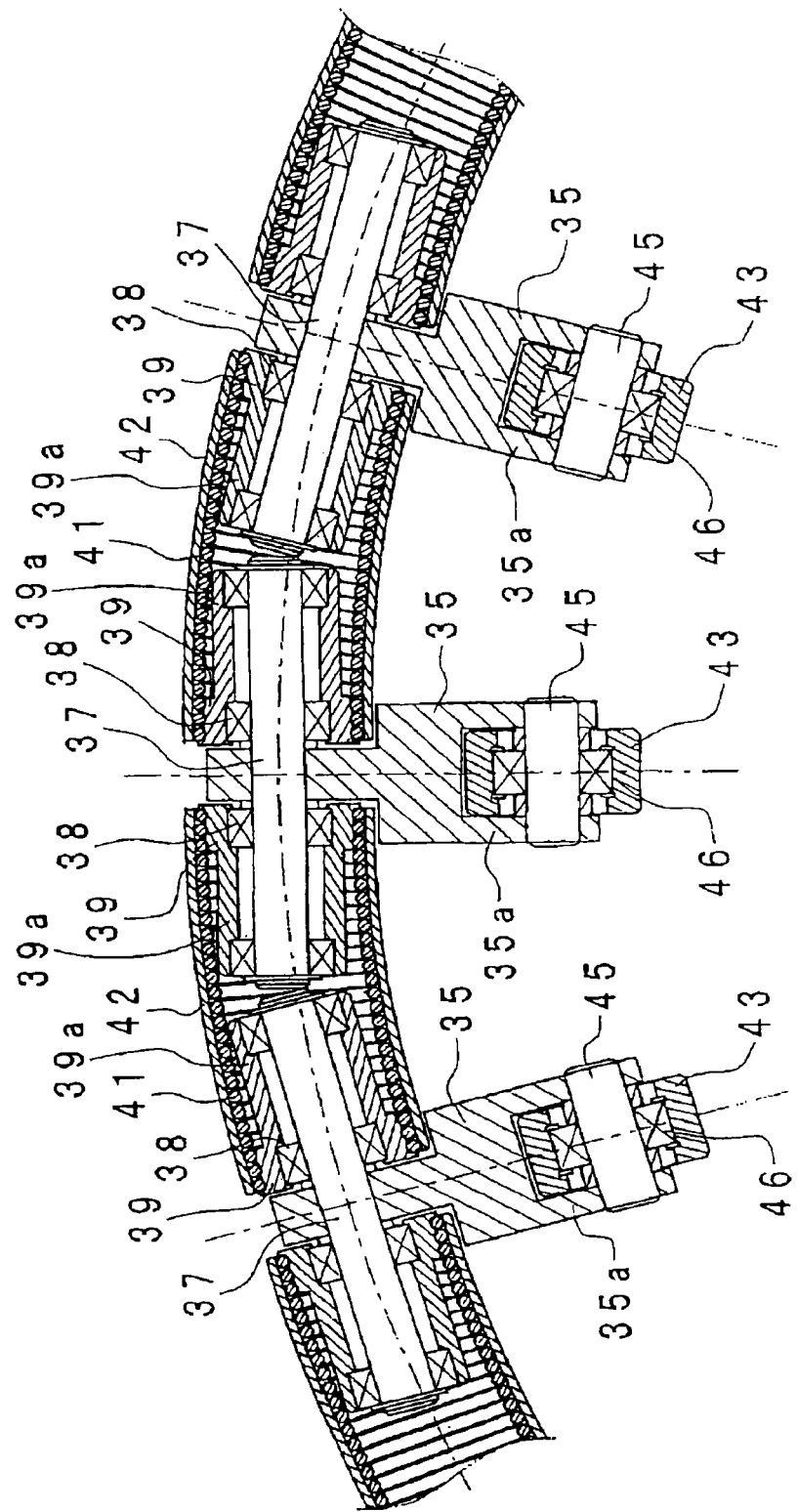
FIG. 10 is a view showing a modified form of the second embodiment.

Further, in a modified form of the second embodiment, as shown in FIG. 10, the rubber tubes 42 may cover the outer surfaces of the coil springs 41 in addition to guiding the opposite end portions of the coil spring 41 by the guide portions 39a. By so doing, it is possible to further increase the rigidity of the coil springs 41.

Figure 11:
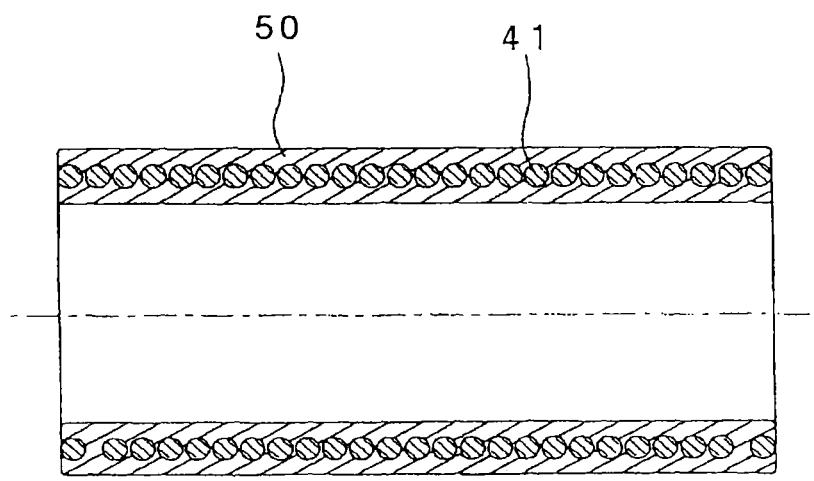
FIG. 11 is a view showing a third embodiment of the preset invention.

FIG. 11 shows a third embodiment of the present invention, and the difference from the first embodiment is that, instead of using the rubber tube 42 to cover the outer surface of the coil spring 41, a rubber elastic member 50 is formed on the coil spring 41 by insert forming to cover the periphery of the coil spring 41. Thus, each coil spring 41 is embedded in the hollow rubber elastic member 50 to have both of outer and inner surfaces thereof covered with the rubber elastic member 50.

According to the third embodiment, it is possible to further increase the rigidity of the coil springs 41 in comparison with that in the first embodiment.

Figure 12:
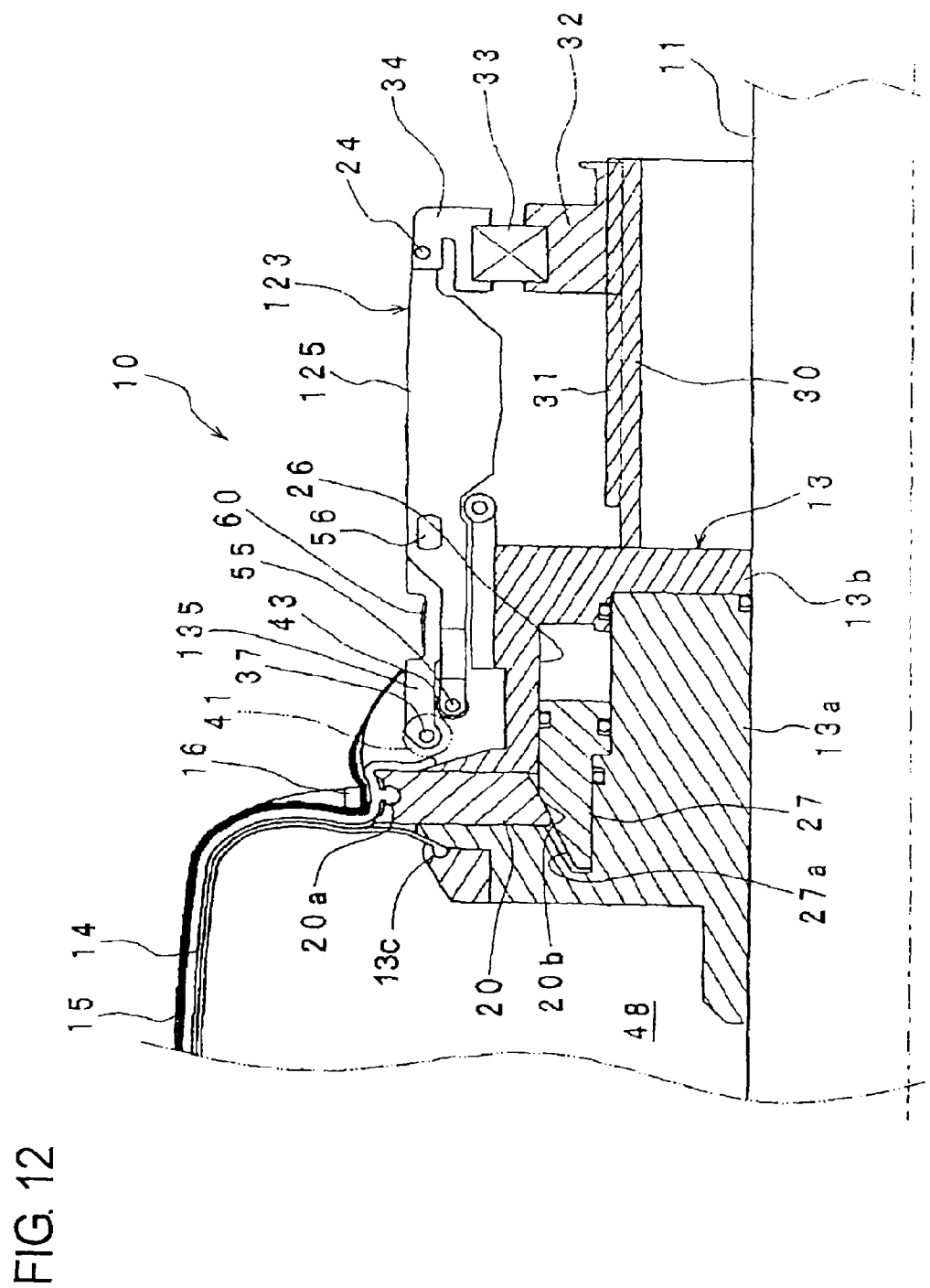
FIG. 12 is a sectional view of a body ply turn-up device in a tire shaping apparatus, showing a fourth embodiment of the present invention.
Figure 13:
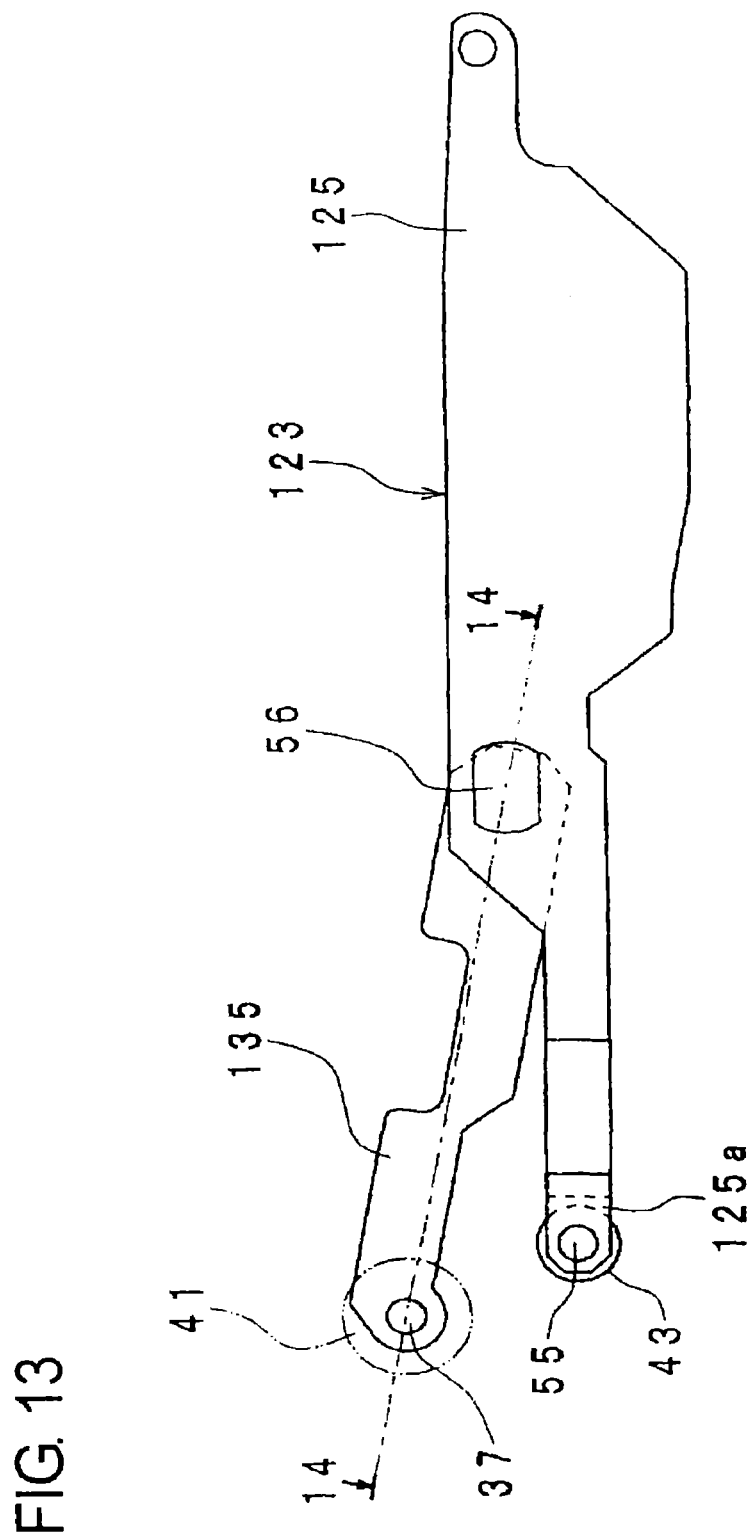
FIG. 13 is a view showing an arm component for the turn-up device.
Figure 14:
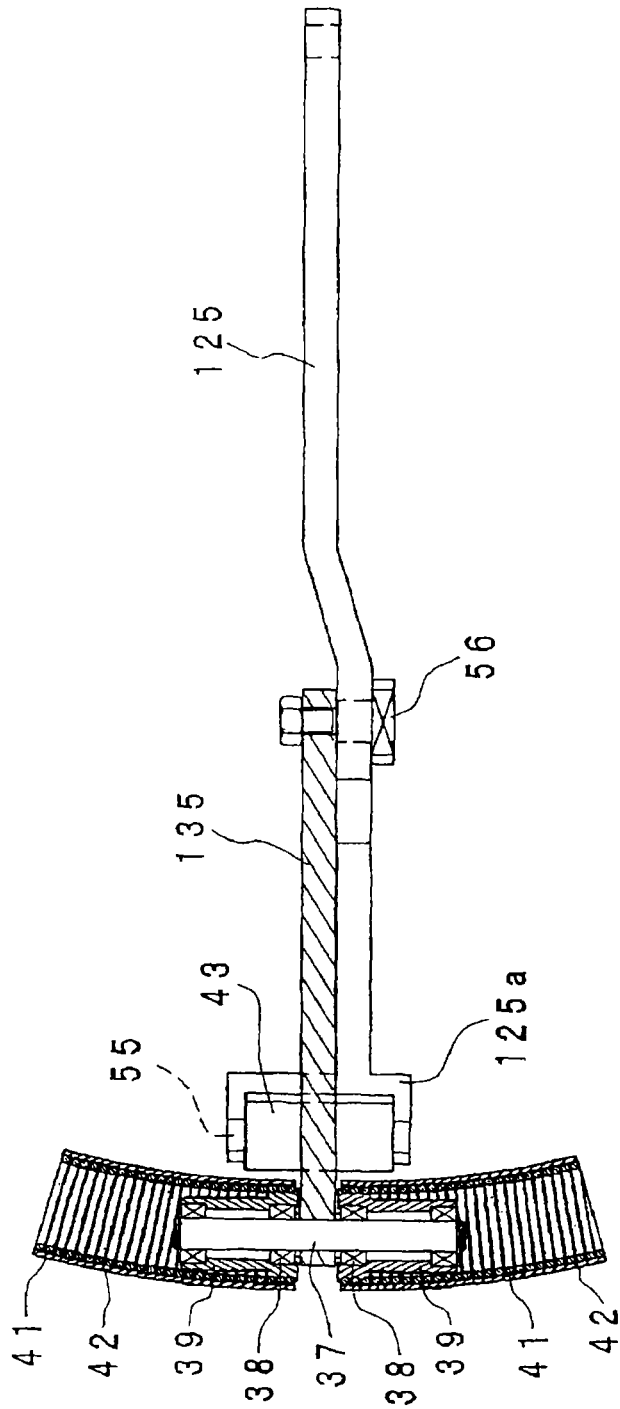
FIG. 14 is a sectional view taken along the line 14-14 in FIG. 13.

FIGS. 12 through 14 show a fourth embodiment of the present invention, and the difference from the first embodiment is that alterations are made with the construction of the arm component 23 which supports the coil spring 41 and the roller member 43. Hereafter, description will be made mainly regarding parts which differ from those in the first embodiment, and regarding the same component parts as those in the first embodiment, description will be omitted by giving the same reference numerals to the same components.

In FIG. 12, like the first embodiment, the turn-up device 10 which turns up the both width-end portions of the body ply 15 is arranged on the pair of movable bodies 13 constituting the tire shaping apparatus. The turn-up device 10 is provided on each movable body 13 with a plurality of arm components 123 in the circumference. Each arm component 123 is composed of a pivotable arm 125 and a link member 135 pivotably supported on the arm 125, and one end of the arm 125 is supported pivotably about the pivot pin 24 provided on the circle which takes the axis of the operating shaft 11 as its center.

At the extreme end portion of each arm 125, as shown in FIGS. 13 and 14, there is formed a bifurcated portion 125a, on which the roller member 43 is rotatably supported by a support shaft 55 parallel to the pivot pin 24. The roller member 43 is arranged to be offset behind the coil spring 41 referred to later, and has a roller width which is wider than the space between the adjoining coil springs 41.

The arm 125 supports the link member 135 to be swingable about a connection pin 56 parallel to the pivot pin 24. The support shaft 37 passes the extreme end portion of the link member 135 in a direction parallel to the pivot axis of the link member 135, and opposite end portions of the support shaft 37 protrude from the both end surfaces of the link member 135 to rotatably support the guide members 39 through the bearings 39, respectively.

The coil spring 41 is interposed between the respective guide members 39 of the adjoining link members 135, and one end of the coil spring 41 is fitted on the outer surface of the guide member 39 supported on one of the link members 135 to be joined bodily, whereas the other end is fitted on the outer surface of the guide member 39 supported on the other link member 135 to be joined bodily. The outer surface of the coil spring 41 is covered with the rubber tube 42 which is rich in elasticity.

An endless elastic member 60 is provided around the plurality of link members 135 to surround the arm components 123, and the plurality of arm components 123 are urged by the elastic force of the elastic member 60 in a circumferentially closed direction (in the direction in which the spaces in the circumferential direction between the link members 135 are narrowed). That is, in the fourth embodiment, the urging force of the coil springs 41 themselves and the urging force of the elastic member 60 serve to press the coil springs 41 and the rollers 43 on the both width-end portions of the body ply 15.

The same effects as described in the first embodiment can be attained even in the foregoing fourth embodiment.

It is to be noted that the arm component 23 supporting the coil spring 41 and the roller member 43 as the first and second pressing members is not limited to the constructions described in the first and fourth embodiments. For example, the coil spring 41 and the roller member 43 may be supported at the extreme end portions of respective arms which are independently pivotable about the pivot shaft 24, and the coil spring 41 may be arranged to be offset behind the roller member 43. In a word, the construction can be so taken that the arm component 23 composed of an arm and another arm or a link member has the coil spring 41 and the roller member 43 arranged thereon to be offset respectively in the forward-rearward direction.

Further, the second pressing members arranged to cover the respective spaces in the circumferential direction between the coil springs 41 are not necessarily limited to the roller members 43. Instead of the roller members, there may be employed coil springs.

In each of the foregoing embodiments, the body ply turn-up device 10 is constituted by a pair of left and right assemblies each composed primarily of the plurality of arm components 23, 123, the coil springs 41 as the first pressing members rotatably interposed in respective spaces between the extreme end portions of the arm components 23, 123 and the rollers 34 as the second pressing members provided to supplementarily cover respective spaces between the coil springs 41. As best shown in FIG. 1, the left and right assemblies are arranged to be symmetrical with respect to a plane which perpendicularly intersects the axis of the operating shaft 11 at the center in the axial direction of the bladder 14. However, it is to be noted that the body ply turn-up device 10 in the present invention can be constituted and implemented by one of the left and right assemblies as that, for example, shown in FIG. 2 to turn up only one of both width-end portions of the body ply 15 to wrap the bead core 16 therein.

As described above, the present invention is not limited to the foregoing embodiments, and it is a matter of course that various forms can be employed without departing from the gist of the present invention described in the claims.

Industrial Applicability

The body ply turn-up device according to the present invention is suitable to shaping not only radial tires being high in turn-up height for passenger cars, but also radial tires or the like for trucks and buses.

The invention claimed is:

1. A body ply turn-up device for turning up at least one of both width-end portions of a body ply expanded into a toroidal shape on an operating shaft to wrap a bead core set at at least one of axially opposite sides of an expanded portion of the body ply, the device comprising:
   a plurality of arm components circumferentially arranged to be movable in the axial direction of the operating shaft and to be pivotable about respective first axes radially of the operating shaft;
   an extreme end portion of each arm component pivotably supporting a respective link member about a respective second axis, the first axis and the second axis of each arm component being parallel;
   guide members respectively supported at both of two circumferentially-facing sides of each link member on one of two longitudinal ends of each link member, each guide member being rotatable about a third axis parallel to the second axis on the same link member;
   coil springs which are attached at each of their ends to a respective one of the guide members such that the coil springs are interposed in respective spaces between circumferentially adjacent pairs of the link members;
   pressing members provided to supplementarily cover respective spaces between circumferentially adjacent ones of the coil springs and supported at respective other ends of the link members behind the coil springs to be rotatable about fourth axes each extending in parallel to the third axis on the same link member, wherein each of the pressing members is circumferentially positioned at the location of one of said spaces between circumferentially adjacent ones of the coil springs and has a circumferential width greater than the circumferential width of the corresponding one of said spaces between circumferentially adjacent ones of the coil springs; and elastic members comprising tubes whose inner surfaces respectively cover the outer surfaces of the coil springs for performing pressing at spaces between spiral wire portions thereof when the arm components are pivoted radially outward of the operating shaft, wherein each link member has its second axis located between its one end and its other end such that as the arm components pivot about their respective first axes the link members pivot about their respective second axes so that the coil springs and the pressing members are even in pressing force.

2. The body ply turn-up device in claim 1, wherein:
the link members are formed with bifurcated portions in correspondence to the respective spaces between the circumferentially adjacent coil springs; and
the pressing members comprise roller members which are arranged to be offset behind the coil springs and which are rotatably supported respectively in the bifurcated portions of the link members.

3. The body ply turn-up device in claim 1, wherein the elastic members comprise rubber tubes.

4. A body ply turn-up device for turning up at least one of both width-end portions of a body ply expanded into a toroidal shape on an operating shaft to wrap a bead core set at at least one of axially opposite sides of an expanded portion of the body ply, the device comprising:
a plurality of arm components circumferentially arranged to be movable in the axial direction of the operating shaft and to be pivotable about respective first axes radially of the operating shaft;
an extreme end portion of each arm component pivotably supporting a respective link member about a respective second axis, the first axis and the second axis of each arm component being parallel;
guide members respectively supported at both of two circumferentially-facing sides of each link member on one of two longitudinal ends of each link member, each guide member being rotatable about a third axis parallel to the second axis on the same link member;
coil springs which are attached at each of their ends to a respective one of the guide members such that the coil springs are interposed in respective spaces between circumferentially adjacent pairs of the link members; and
pressing members provided to supplementarily cover respective spaces between circumferentially adjacent ones of the coil springs and supported at respective other ends of the link members behind the coil springs to be rotatable about fourth axes each extending in parallel to the third axis on the same link member, wherein each of the pressing members is circumferentially positioned at the location of one of said spaces between circumferentially adjacent ones of the coil springs and has a circumferential width greater than the circumferential width of the corresponding one of said spaces between circumferentially adjacent ones of the coil springs;
wherein the guide members are provided in pairs having a respective guide member at both end portions of each of the coil springs, to guide both end portions of each of the coil springs as the coil springs expand; and
wherein each pair of the guide members guiding both end portions of a respective coil spring include portions which are smaller than an inner diameter of the respective coil spring and which extend to positions approaching each other at a center in a lengthwise direction of the respective coil spring in a state that the arm components are contracted, wherein each link member has its second axis located between its one end and its other end such that as the arm components pivot about their respective first axes the link members pivot about their respective second axes so that the coil springs and the pressing members are even in pressing force.

5. The body ply turn-up device in claim 4, wherein:
the link members are formed with bifurcated portions in correspondence to the respective spaces between the circumferentially adjacent coil springs; and
the pressing members comprise roller members which are arranged to be offset behind the coil springs and which are rotatably supported respectively in the bifurcated portions of the link members.

6. The body ply turn-up device in claim 4, further comprising:
elastic members respectively covering at least the outer surfaces of the coil springs for performing pressing at spaces between spiral wire portions thereof when the arm components are pivoted radially outward of the operating shaft.

7. A body ply turn-up device for turning up at least one of both width-end portions of a body ply expanded into a toroidal shape on an operating shaft to wrap a bead core set at at least one of axially opposite sides of an expanded portion of the body ply, the device comprising:
a plurality of arm components circumferentially arranged to be movable in the axial direction of the operating shaft and to be pivotable about respective first axes radially of the operating shaft;
an extreme end portion of each arm component pivotably supporting a respective link member about a respective second axis, the first axis and the second axis of each arm component being parallel;
guide members respectively supported at both of two circumferentially-facing sides of each link member on one of two longitudinal ends of each link member, each guide member being rotatable about a third axis parallel to the second axis on the same link member;
coil springs which are attached at each of their ends to a respective one of the guide members such that the coil springs are interposed in respective spaces between circumferentially adjacent pairs of the link members; and
pressing members provided to supplementarily cover respective spaces between circumferentially adjacent ones of the coil springs and supported at respective other ends of the link members behind the coil springs to be rotatable about fourth axes each extending in parallel to the third axis on the same link member, wherein each of the pressing members is circumferentially positioned at the location of one of said spaces between circumferentially adjacent ones of the coil springs and has a circumferential width greater than the circumferential width of the corresponding one of said spaces between circumferentially adjacent ones of the coil springs, wherein each link member has its second axis located between its one end and its other end such that as the arm components pivot about their respective first axes the link members pivot about their respective second axes so that the coil springs and the pressing members are even in pressing force.

* * * * *